United States Patent [19]

Monaco et al.

[11] 4,034,349

[45] July 5, 1977

[54] APPARATUS FOR PROCESSING INTERRUPTS IN MICROPROCESSING SYSTEMS

[75] Inventors: Robert F. Monaco, Jeffersonville; Nicholas Derchak, Hatfield, both of Pa.

[73] Assignee: Sperry Rand Corporation, New York, N.Y.

[22] Filed: Jan. 29, 1976

[21] Appl. No.: 653,409

[52] U.S. Cl. .............................................. 364/200
[51] Int. Cl.² ...................... G06F 3/04; G06F 9/18
[58] Field of Search ...................... 340/172.5; 445/1

[56] References Cited

UNITED STATES PATENTS

| | | | |
|---|---|---|---|
| 3,061,192 | 10/1962 | Terzian | 340/172.5 |
| 3,560,935 | 2/1971 | Beers | 340/172.5 |
| 3,710,324 | 1/1973 | Cohen et al. | 340/172.5 |
| 3,800,287 | 3/1974 | Albright | 340/172.5 |
| 3,828,325 | 8/1974 | Stafford et al. | 340/172.5 |
| 3,909,790 | 9/1975 | Shapiro et al. | 340/172.5 |
| 3,924,240 | 12/1975 | Given | 340/172.5 |

*Primary Examiner*—Melvin B. Chapnick
*Attorney, Agent, or Firm*—B. Franklin Griffin, Jr.

[57] ABSTRACT

Circuitry external of a microprocessor determines priority between different peripheral devices requesting interrupts to generate a restart vector and a signal granting priority to one of the interrupt-requesting devices. The peripheral device loads its status and address into two addressable registers connected to a common system bus. The restart vector is loaded into the instruction register of the microprocessor. The microprocessor treats the restart vector as an instruction to store the contents of the program counter in memory and loads certain bits of the restart vector into the program counter. These bits represent the starting address of a subroutine of eight instructions for analyzing the interrupt. An interrupt is recognized and the status and identification of the interrupting device is stored in a single instruction cycle. On the next instruction cycle the first instruction of the interrupt analysis routine may begin. During this analysis routine the contents of the two addressable registers may be read out to determine which device caused the interrupt and what action should be taken in view of the status of the interrupting device. Provision is made for processing interrupts other than those requested by peripheral devices, and each type of interrupt generates a different restart vector thus selecting a different address as the first instruction address of the interrupt analysis routine.

11 Claims, 5 Drawing Figures

APPARATUS FOR PROCESSING INTERRUPTS IN MICROPROCESSING SYSTEMS

BACKGROUND OF THE INVENTION

In prior art data processing systems of the type employing a plurality of peripheral devices such as card readers, printers, etc., it has been customary for the peripheral devices, acting through some sort of controller, to request an interruption of the central processor program for the purpose of reporting the status of the interrupting peripheral devices. In these prior art systems it has been customary to execute a series of instructions during which the interrupting device is identified, and then execute a second instruction to obtain from the interrupting device its status. Once the status is received from the interrupting device, the central processor vectors or jumps to an appropriate subroutine to analyze the cause of the interrupt and determine what should be done in response thereto.

The interrupt handling apparatus of the prior art requires a considerable number of special hardware components and special software and is thus costly in addition to consuming more processor time than necessary to process interrupt requests. Furthermore, some of the recently developed microprocessors have only a limited number of instructions for communicating with peripheral devices. For example, the INTEL 8080 microprocessor may communicate with peripheral devices only with an input and an output instruction. This has restricted the procedure and increased the time required to process an interrupt request and vector to a subroutine to analyze the interrupt.

SUMMARY OF THE INVENTION

An object of the present invention is to provide means for processing interrupt requests, said means being simpler than the prior art means utilized for this purpose, and requiring less time.

Another object of the present invention is to provide means for processing an interrupt, storing the address and status of the interrupting device, and vectoring to the first address of an interrupt analysis subroutine, all within one instruction cycle.

Another object of the invention is to provide interrupt processing means including interrupt priority encoding means, means responsive to the interrupt priority encoding means for generating a restart vector, means responsive to the interrupt priority encoding means for signalling the interrupting device that is granted priority, register means for storing the address and status of the interrupting device, and means for entering the generated restart vector into the instruction register of a central processor as the first instruction to be executed after an interrupting device is granted priority.

A further object of the invention is to provide interrupt processing means as defined above wherein the central processor is a microprocessor and the addressable registers are external to the microprocessor and connected to a system bus; the interrupting device, the microprocessor, and a memory also being connected to the system bus.

In accordance with the principles of the present invention, interrupted priority encoding means senses interrupt requests placed on a system bus by peripheral devices and generates an interrupt request signal to the microprocessor. At such time as the microprocessor acknowledges the interrupt request signal, a bus grant signal is sent back to the requesting device that is granted priority. At the same time, the interrupt priority encoding means generates a restart vector into the microprocessor. The interrupt requesting device responds to the bus grant signal by loading its address and status into two registers connected to a common bus external to the microprocessor where they are saved until an interrupt analysis subroutine is executed. The microprocessor includes means responsive to the presence of the restart vector in the instruction register for storing the contents of a program counter in memory, and entering part of the restart vector into the program counter as the address of the first instruction of a subroutine for analyzing the cause of the interrupt.

Other objects of the invention and its mode of operation will become apparent upon consideration of the following description and the accompanying drawings.

DETAILED DESCRIPTION OF THE INVENTION

Figure 4:
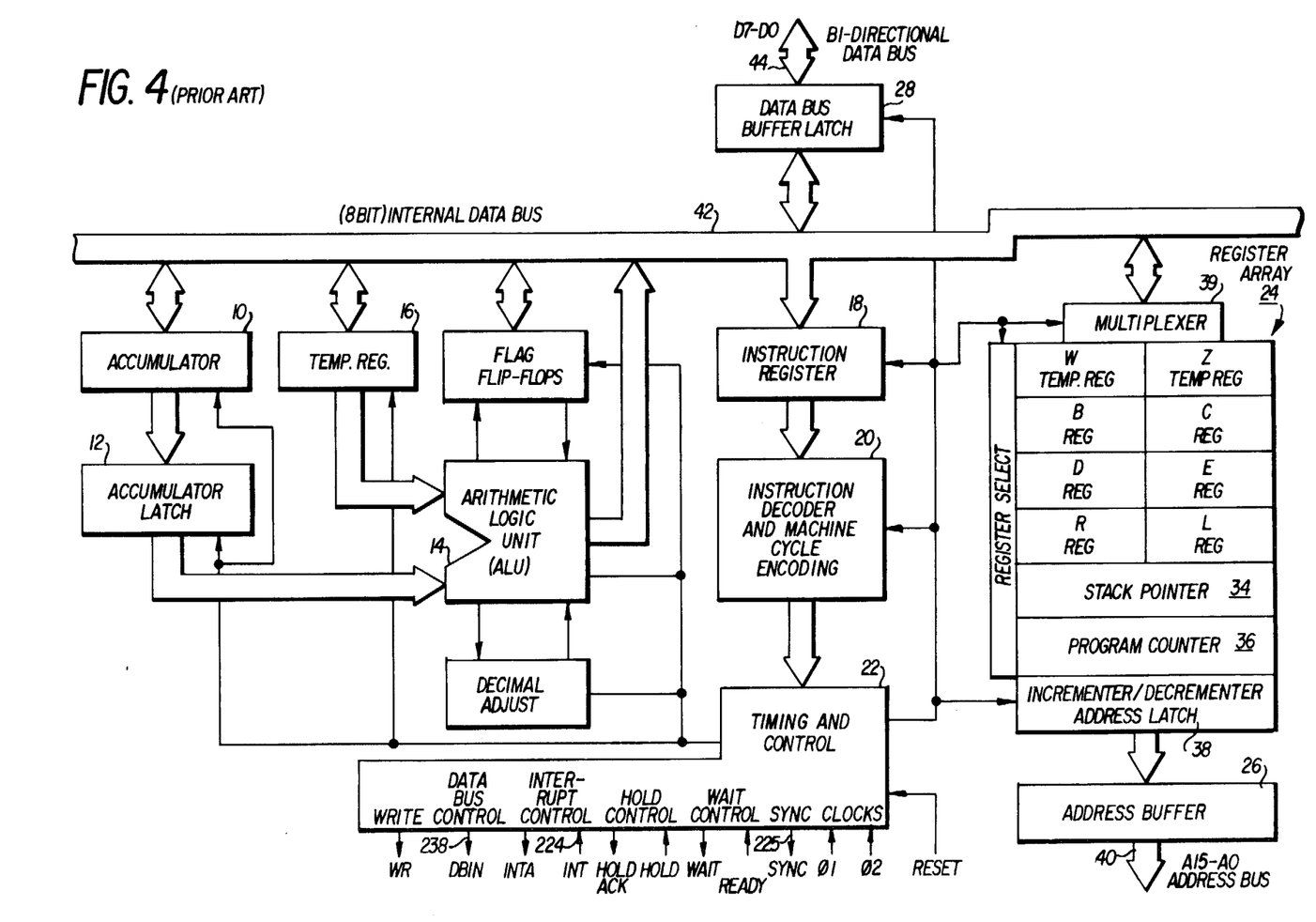
FIG. 4 is a functional block diagram of a prior art microprocessor which may be utilized for acting on the restart vector generated by the circuits of FIG. 2; and, FIG. 5 is a timing diagram showing the times at which various signals occur within the system.

The present invention will be described as it is used in conjunction with an INTEL 8080 microprocessor, a functional block diagram of which is shown in FIG. 4. The microprocessor includes an Accumulator 10, and Accumulator Latch 12, a Arithmetic Logic Unit 14, an Temporary Register 16, an Instruction Register 18, an Instruction Decoder and Machine Cycle Encoding Circuit 20, a Timing and Control Circuit 22, a Register Array 24, an Address Buffer 26 and a Data Bus Buffer/Latch 28.

Insofar as it relates to the present invention, the Register Array includes a Stack Pointer Counter 34, a Program Counter 36 and an Incrementer/Decrementer and Address Latch 38. The program Counter 36 contains the memory address of the current program instruction and is incremented automatically during each instruction fetch. The contents of the Program Counter are read out to the Address Latch 38 and are applied through Address Buffer 26 to an address bus 40 for the purpose of addressing the memory location containing the instruction. The contents of the Address Latch are then passed through the Incrementer/-Decrementer where the value is incremented by one before being returned to the Program Counter.

During operation of the microprocessor, it may be necessary to temporarily store the contents of certain registers or the contents of the program counter. A certain area of memory is reserved for storing these values, and the Stack Pointer Counter 34 is provided for storing or retreiving these values from the memory. The contents of the Stack Pointer Counter 34 represents the address of the next available stack location in the memory. When another value is to be stacked in the memory, the Stack Pointer Counter is read out to the Address Latch 38 and, through Address Buffer 26, addresses the Memory to allow the data to be stored. The value in the Address Latch is then returned to the Stack Pointer Counter through the Incrementer/Decrementer which decrements the value by one. When one of the values stacked in Memory is to be removed from the stack, essentially the same procedure is followed except that the value is incremented as it is returned to the Stack Pointer Counter from the Address Latch.

Register Array 24 includes several single byte (8-bit) registers which may be operated in pairs. Two of these registers, W and Z, are not program addressable and are used only for the internal execution of instructions. Data in the W and Z registers may be transferred under control of Timing and Control circuits 22 to the Address Latch 38 for the purpose of addressing Memory and, after being incremented by the Incrementer/Decrementer may be entered into the Program Counter 36. Eight-bit data bytes are entered into the W and Z Registers through a Multiplexer 39 from bidirectional internal data bus 42.

The bidirectional internal data bus 42 is provided for the transfer of 8-bit bytes of data between Register Array 24, Accumulator 10, Arithmetic Logic Unit 14, Temporary Register 16, and Instruction Register 18. In addition, the internal data bus 42 is connected to the data bus buffer/latch 28 so that 8-bit bytes of data be transferred in either direction between the internal data bus 42 and a bidirectional CPU data bus 44.

Figure 5:
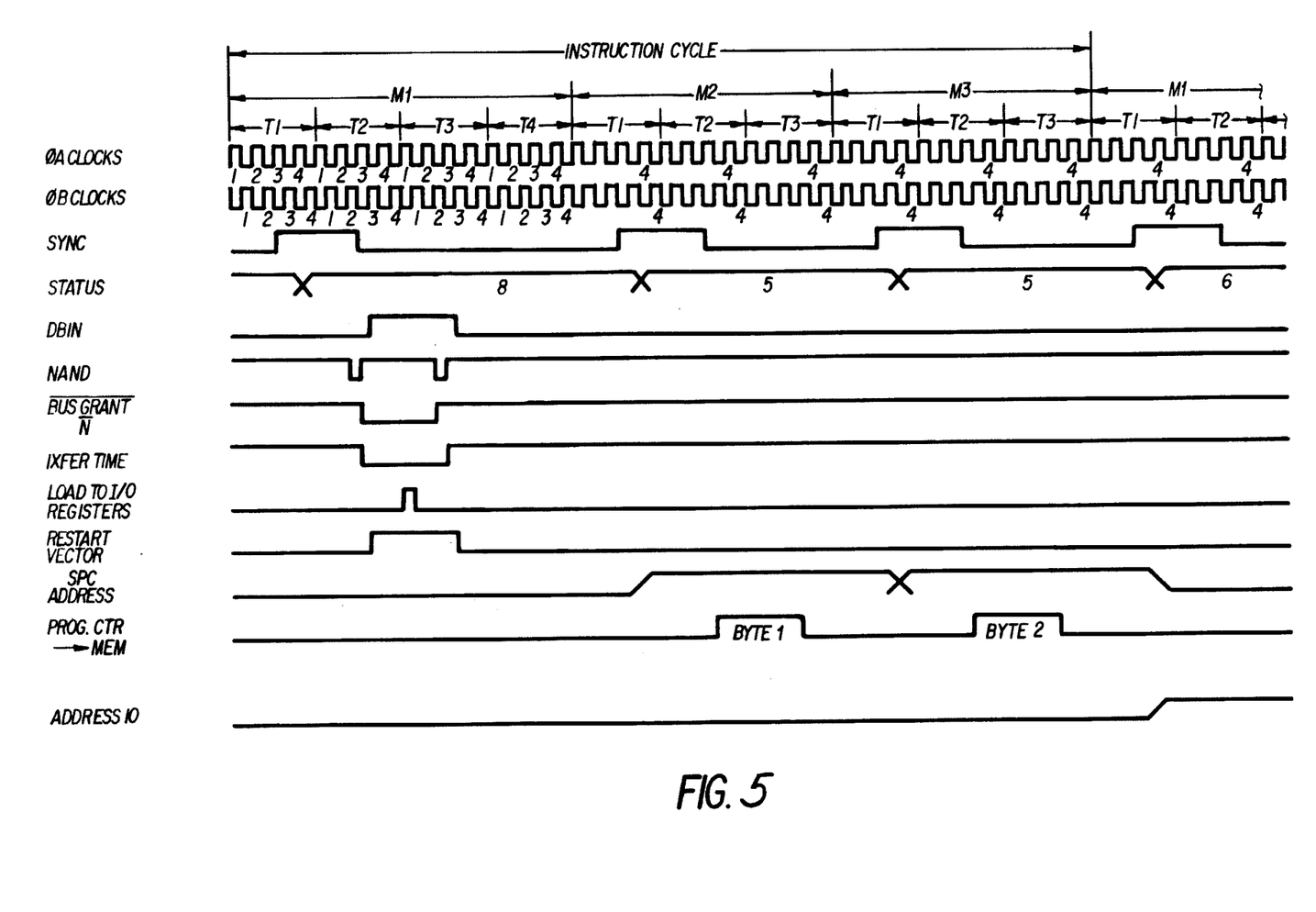

Instructions are entered into the Instruction Register 18 and are decoded by the Instruction Decoder and Machine Cycle Encoding Circuit 20 to control the Timing and Control Circuit 22. The Timing and Control Circuit produces the timing and control signals which are applied to various elements within the microprocessor for the purpose of carrying out the instructions. In addition, Timing and Control Circuit 22 receives certain signals from, and transmits certain signals to, terminals which may, in turn, be connected to elements external of the Microprocessor. All of these signals are not utilized in the practice of the present invention. The timing of those that are utilized is illustrated in FIG. 5.

The Microprocessor has the capability of responding to certain restart instructions placed in Instruction Register 18 to excute two stack write operations to store the contents of the Program Counter 36 in memory, and then load the Program Counter with another value stored in Temporary Register 16. In this sequence, the contents of Temporary Register 16 (bits 3-5 only) are transferred to Register Z of the Register Array 24 after Registers W and Z are both cleared. After the second stack write is completed the contents of W and Z are transferred to the Address Latch 38 to address memory and withdraw the first instruction of a subroutine from memory. The contents of the Address Latch are then incremented and stored in the Program Counter 36 for use in withdrawing subsequent instructions of the subroutine from memory. The restart instruction codes and the addresses of the first instructions of the subroutines are set forth in Table I.

TABLE I

| Restart Instruction Code (Hexidecimal) | First Instruction Address (Hexidecimal) |
|---|---|
| C7 | 0 |
| CF | 8 |
| D7 | 10 |
| DF | 18 |
| E7 | 20 |
| EF | 28 |
| F7 | 30 |
| FF | 38 |

The Microprocessor of FIG. 4 operates with instruction cycles comprising one to five machine cycles M1-M5. Each machine cycle comprises three, four or five subcycles designated T cycles. Each T cycle is 500 nano-seconds in duration. As illustrated in FIG. 5, all five machine cycles and all T subcycles are not required in conjunction with the interrupt sequence of this invention. During T1 of each machine cycle, the microprocessor Timing and Control Circuits 22 produce the signal SYNC. In addition, Timing and Control Circuits 22 produce the signal DBIN on each T cycle during which data on the bi-directional data bus 44 is to be fed into the Micro-processor through the Data Bus Buffer/Latch 28. It is also a characteristic of the INTEL 8080 microprocessor that the Instruction Decoder and Machine Cycle Enoding Circuits 20 generate a status word which is placed on the data bus 44 during SYNC time of each machine (M) cycle. These status words provide an indication of the status of the Micorprocessor and have the formats shown in Table II.

TABLE II

| DATA BUS BIT STATUS DATA | D0 INTA | D1 WO | D2 STACK | D3 HLTA | D4 OUT | D5 MI | D6 INP | D7 MEMR |
|---|---|---|---|---|---|---|---|---|
| Fetch | 0 | 1 | 0 | 0 | 0 | 1 | 0 | 1 |
| Memory Read | 0 | 1 | 0 | 0 | 0 | 0 | 0 | 1 |
| Memory Write | 0 | 0 | 0 | 0 | 0 | 0 | 0 | 0 |
| Stack Read | 0 | 1 | 1 | 0 | 0 | 0 | 0 | 1 |
| Stack Write | 0 | 0 | 1 | 0 | 0 | 0 | 0 | 0 |
| Input Read | 0 | 1 | 0 | 0 | 0 | 0 | 1 | 0 |
| Output Write | 0 | 0 | 0 | 0 | 1 | 0 | 0 | 0 |
| Interrupt Ack. | 1 | 1 | 0 | 0 | 0 | 1 | 0 | 0 |
| Halt Ack. | 0 | 1 | 0 | 1 | 0 | 0 | 0 | 1 |
| Interrupt Ack. While Halt | 1 | 1 | 0 | 1 | 0 | 1 | 0 | 0 |

Figure 1:
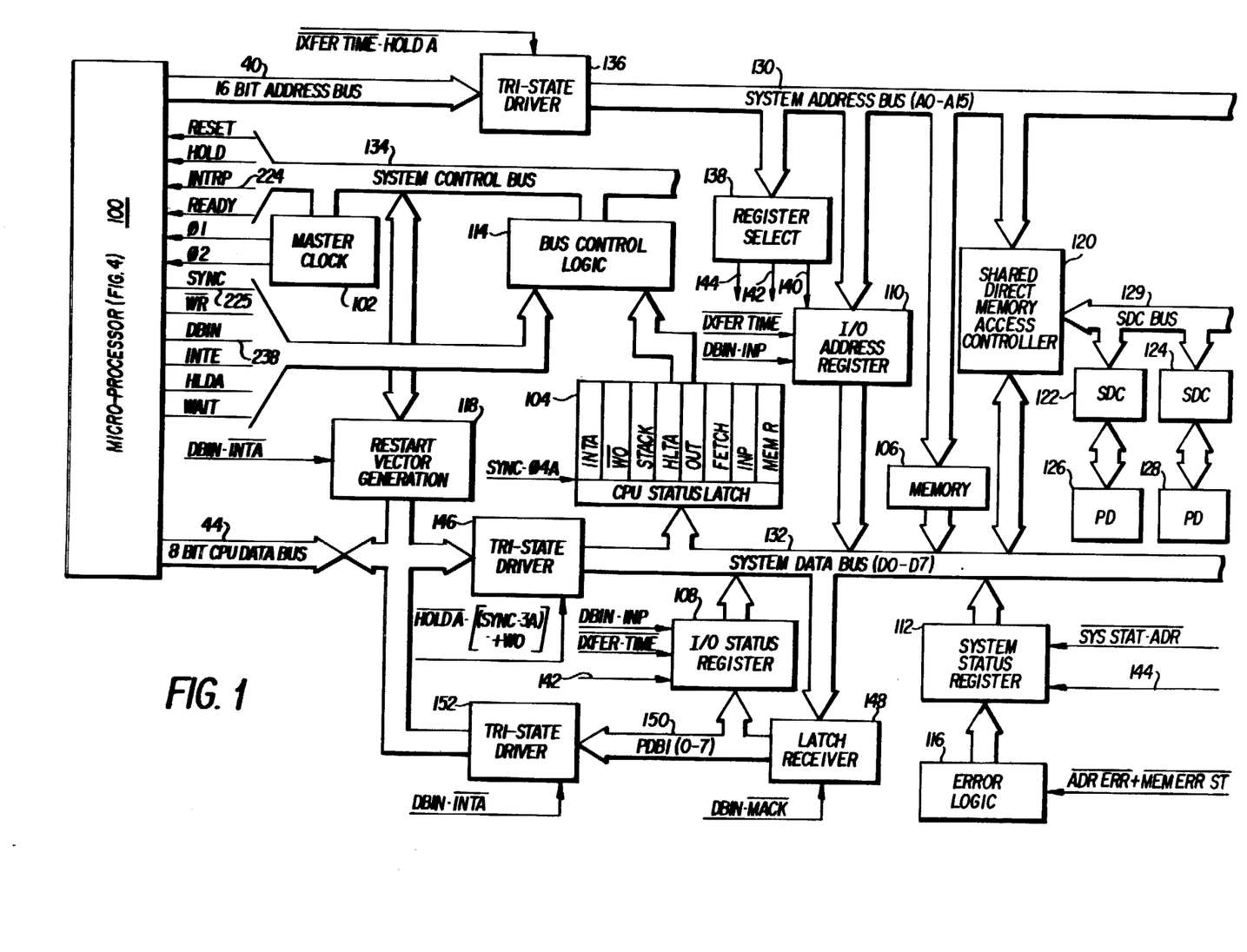
FIG. 1 is a block diagram of a microprocessor system embodying the principles of the present invention.

Referring now to FIG. 1, a Microprocessor 100 having the characteristics previously described is combined with external circuit elements to form a microprocessor system having a Master Clock 102, a CPU Status Latch 104, a Memory 106, an I/O Status Register 108, an I/O Address Register 110, a System Status Register 112, Bus Control Logic Circuits 114, Error Logic Circuits 116, and a Restart Vector Generation Circuit 118. For purposes of illustrating the invention, the microprocessor system is illustrated as including a single Shared Direct Memory Access Controller (SDMA) 120. However, plural SDMA's as well as Disc Direct Memory Access Controllers may be employed as described in the copending application of Derchak, Ser. No. 653,408 filed concurrently herewith and incorporated herein by reference. The SDMA 120 controls a plurality of Subsystem Device Controllers (SDC's) 122 and 124 which in turn control a plurality of Peripheral Devices 126 and 128.

The microprocessor system is provided with a common system bus including a 16-bit System Address Bus 130, an 8-bit System Data Bus 132, and a System Control Bus 134. Addresses placed on the address bus 40 by the Microprocessor 100 may be gated through a set of Tri-State Drivers 136 to the System Address Bus 130. Addresses on the System Address Bus 130 may be applied to a Register Select circuit 138 to produce a signal on one of three leads 140, 142 or 144 to thereby address the I/O Address Register 110, the I/O Status Register 108 or the system Status Register 112. Addresses on System Address Bus 130 may be applied to the Memory 106 for the purpose of writing into the memory or reading out of the memory, a byte of data placed on the System Data Bus 132. An 8-bit address byte placed on the System Address Bus 130 maybe passed through the SDMA 120 and over the SDC Bus 129 to select or address one of the SDC's 122, 124, etc., as described in the aforementioned co-pending application. In addition, addresses generated within the SDMA 120 in response to interrupt signals from the SDC's may be gated onto the System Address Bus 130 and stored in the I/O Address Register 110.

Output data from the Microprocessor 100 may be passed through a set of Tri-State Drivers 146 to the System Data Bus 132 for storage in Memory 106. As previously stated, the microprocessor outputs a status byte on data bus 44 during T1 of each machine cycle. These status words pass through Tri-state Drivers 146 and are stored in the CPU Status Latches 104. Data from the Memory 106, I/O Address Register 110, I/O Status Register 108, or System Status Regiser 112 may be entered into the microprocessor by passing over the System Data Bus 132, through a set of Latch Receivers 148, over Processor Data Input Bus 150, through a set of Tri-State Drivers 152, and over the CPU Data Bus 44 into the microprocessor. Restart vectors generated by the Restart Vector Generation Circuit 118 are fed directly into the Microprocessor 100 over the CPU data bus 44.

As explained in the aforementioned co-pending application, direct data transfers may be made in either direction between Memory 106 and any of the SDC's. The SDMA 120 generates the required memory address and applies it over the System Address Bus 130 to the Memory 106. The actual data transfer takes place in either direction over a path including Memory 106, System Data Bus 132, SDMA 120, the SDC Bus 129 and the active one of the SDC's.

The system Control Bus 134 carries control signals throughout the system. Signals derived from Timing and Control Circuits 22 of the Microprocessor 100 are applied to the Bus Control Logic Circuit 114 and this circuit, in turn, supplies certain signals as hereinafter described to the System Control Bus 134. Master Clock 102 generates $\phi 1$ and $\phi 2$ clock signals for driving the Microprocessor 100. In addition, Master Clock 102 generates A and B clock pulses of 62.5 nanoseconds each (see FIG. 5) and applies these to various elements of the microprocessor system over the System Control Bus 134.

Reference may be made to the aforementioned co-pending application for a complete description of how an SDC may act through SDMA 120 to generate an interrupt request for the purpose of reporting some status condition of the SDC. It is sufficient to note for purposes of explaining the present invention that the SDMA 120 includes a register which is loaded with an 8-bit byte representing the status of the SDC making an interrupt request. After this register is loaded the SDC sends an interrupt request over the System control Bus 134 to the Bus Control Logic 114. When the interrupt is granted the Bus Control logic 114 sends a BUS GRANT signal back over the System Control Bus 134 to the SDMA 120. The BUS GRANT signal causes the SDMA to place on System Address Bus 130 an 8-bit byte representing the address of the SDMA and the number of the SDC when made the interrupt request. At the same time, the status stored in the register in the SDMA 120 is read out on the System Data Bus 132. As subsequently described, this status, which comprises one 8-bit byte, is stored in the I/O Status Register 108 at the same time the address byte is stored in I/O Address Register 110.

Figure 2:
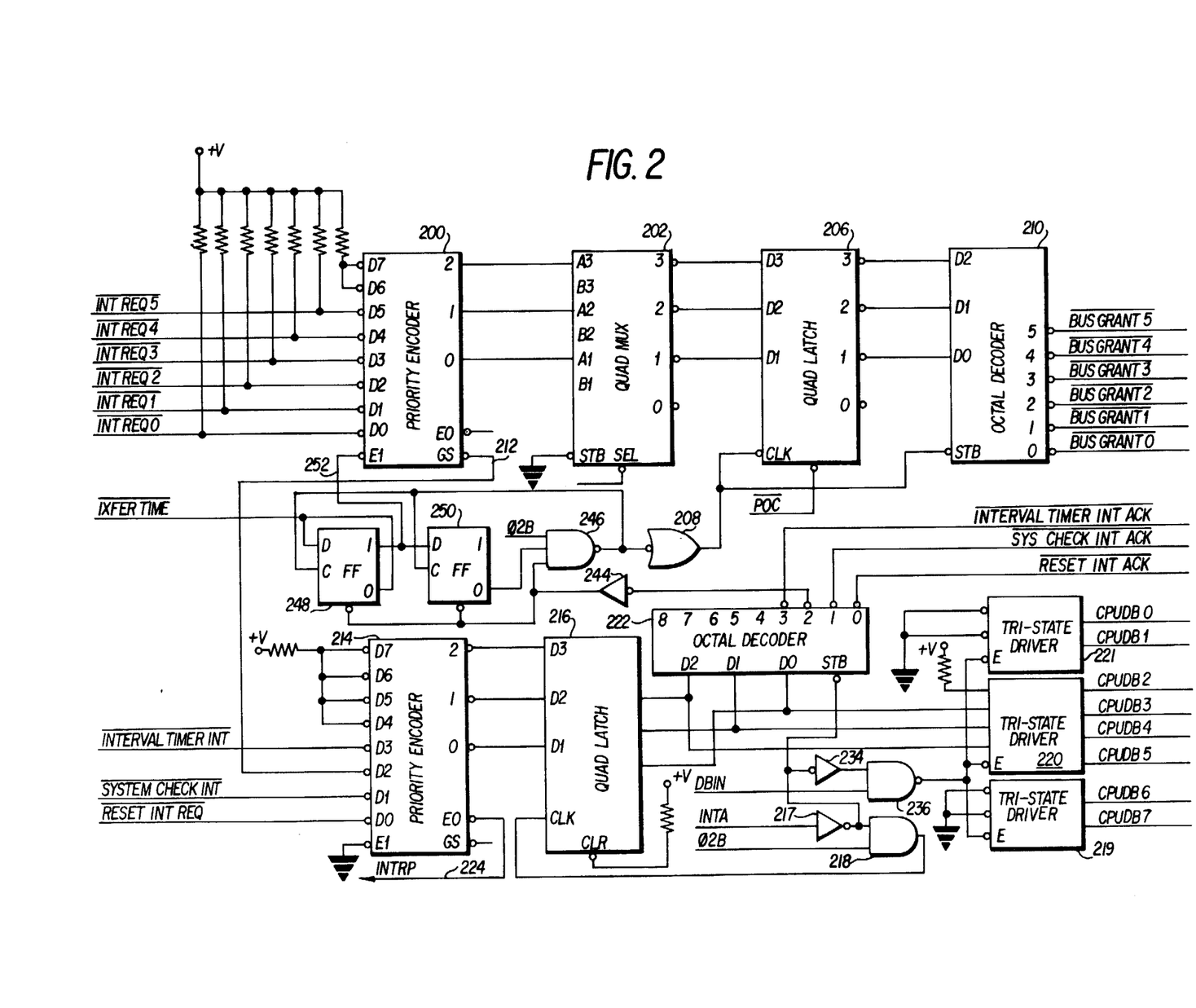
FIG. 2 is a logic diagram showing the interrupt priority encoding means and the means for generating a restart vector.

Referring now to FIG. 2 the INTERRUPT REQUEST signal generated by the SDMA 120 of FIG. 1, as well as all of the interrupt request signals from the Disc Direct Memory Access Controllers and any other SDMA's connected to the system bus, are applied over the system control bus 134 to an Interrupt Request Priority Encoder 200 in Bus Control Logic circuit 114. The Interrupt Request Priority Encoder 200 has eight data inputs D0-D7 and an enabling input E1. Data inputs D0-D5 receive the interrupt request signals $\overline{\text{INT REQ 0}} - \overline{\text{INT REQ 5}}$. In the disclosed system only six Disc Direct Memory Access Controllers and SDMA's are employed, hence the D6-D7 inputs of the Priority Encoder are permanently disabled by connecting them to +V. The D0 input receives the highest priority interrupt request signal while the D5 input receives the lowest priority interrupt request signal. The Priority Encoder may receive more than one interrupt request at a time, but it can respond to these requests only when a low level signal enables the input E1. At this time the Priority Encoder produces a three bit binary output code corresponding to the highest priority interrupt request being received. For example, if the signal $\overline{\text{INT REQ 3}}$ is the highest priority signal being applied to the Priority Encoder at the time it is enabled, then the Priority Encoder produces signals representing the binary value 011 at its three outputs, the zero bit appearing at the terminal 2 output.

The three binary bits from Priority Encoder 200 are applied to the A3, A2, and A1 inputs of an inverting QUAD MUX chip 202. The B3, B2 and B1 inputs of QUAD MUX 202 are connected to the outputs of a priority encoder, not shown, which receives BUS REQUEST signals from the SDMA's and Disc Direct Memory Access Controllers.

The strobe input of QUAD MUX 202 is permanently enabled and, during an interrupt sequence the signal applied to its SEL input will be at a low level so that the binary valve applied to the A inputs of the QUAD MUX appears at its outputs. A signal inversion takes place in passing through QUAD MUX 202, hence if Priority Encoder 200 produces the binary valve 011 then the output of QUAD MUX 202 is 100.

The output signals from QUAD MUX 202 are applied to the D3, D2 and D1 inputs of a Quad Latch chip 206. The chip includes four latches, only three of which are utilized in the present invention. Signals appearing at the D3, D2 and D1 inputs of Quad Latch 206 are gated into the latches only when the signal at its clock input makes transition to the high level. The clock input signal is derived from a NOR 208 as subsequently described. The signal $\overline{POC}$ drops to the low level to clear latches 206 only when the power is turned on. Otherwise, the value contained in the latches 206 always represents the signals that were applied to the inputs D3–D1 at the time the last clock pulse occurred.

Signal inversion is accomplished in Quad Latch 206, hence if the binary value 100 is applied to the latches they produce the binary output value 011. The output signals from Quad Latch 206 are applied to an Octal Decoder 210. The Decoder 210 is enabled when the output of NOR 208 is at the low level. When the Decoder is enabled it produces a low level output signal at one of several outputs, depending upon the binary value applied to its D2, D1, and D0 inputs. For the assumed example where the binary input value is 011, the Decoder 210 produces the low level output signal $\overline{BUS\ GRANT\ 3}$. This signal is sent back over the system control bus to the SDMA or Disc Direct Memory Access Controller which generated the signal $\overline{INT\ REQ\ 3}$, and informs the SDMA or Disc Direct Memory Access Controller that its interrupt request has been honored and it may now place on the system address bus and the system data bus an address byte and a status byte, respectively. Octal Decoder 210 has no storage capability but merely decodes the output of Quad Latch 206. As will become evident later, once Quad Latch 206 is set it will remain set for one T cycle from $\phi 2B$ to $\phi 2B$, hence the BUS GRANT signal will be generated from the end of $\phi 2B$ to the beginning of the next $\phi 2B$, or about 440 nanoseconds.

When the Interrupt Request Priority Encoder 200 recognizes any interrupt request, it produces a low level signal on lead 212. This signal is applied to another Priority Encoder 214 the purpose of which is to determine priority between interrupt requests received from the direct memory access controllers and other types of interrupt requests. Priority Encoder 214 is permanently enabled by connecting its E1 input to ground. The D3 input of the Encoder 214 receives a signal $\overline{INTERVAL\ TIMER\ INT}$ which drops to the low level an interval timer (not shown) determines that an operation has not been completed within the allotted time. The D2 input of the Encoder 214 receives the output signal from Encoder 200 over lead 212 while the D1 input receives the signal $\overline{SYSTEM\ CHECK\ INT}$. $\overline{SYSTEM\ CHECK\ INT}$ is generated when a memory addressing error or a memory parity error occurs. The D0 input of Encoder 214 receives a signal $\overline{RESET\ INT\ REQ}$ which is generated by circuitry (not shown) when the operator depresses the reset button on the control panel.

The Encoder 214 has three output leads connected to the D3, D2 and D1 inputs of a Quad Latch 216. Whenever the Encoder 214 receives a low level signal at one of its D inputs it produces a three bit binary value on these output leads to indicate the type of interrupt that has been granted priority.

At the time Priority Encoder 214 first produces a binary code at its outputs, the signal INTA is at the low level and through an Inverter 217 enables an AND 218. At the next $\phi 2B$ AND 218 produces a high level signal to clock the binary output of Priority Encoder 214 into Quad Latch 216.

The binary value latched into Quad Latch 216 is applied to three inputs of a Tri-State Driver chip 220, and to the D2, D1 and D0 inputs of an Octal Decoder 222. However, the Tri-State Drivers 220 and the Octal Decoder 222 cannot accept output singals from Quad Latch 216 at this time.

The Priority Encoder 214 has an output terminal EO which is normally at a low level and rises signal at any of ints D inputs. The outputs signal from terminal EO is the signal INTERRUPT which is applied over a lead 224 and the System Control Bus 134 to the Microprocessor 100. Nothing further happens until the Microprocessor 100 is ready to honor the interrupt. This occurs at M1 time of the instruction cycle following the occurrence of the INTERRUPT signal on lead 224. When the interrupt is honored, the Microprocessor 100 places an INTERRUPT ACKNOWLEDGE status word on the CPU Data Bus 44. The Microprocessor 100 generates the signal SYNC on lead 225 which is ANDed with a $\phi 3A$ clock pulse and the signal $\overline{HOLD\ A}$. $\overline{HOLD\ A}$ is at the high level during M1 of the interrupt operation so at $\phi 3A$ during SYNC the Tri-State Drivers 146 are enabled so that the status word is transmitted over the System Data Bus 132 to the CPU Status Latches 104.

At $\phi 4A$ of the M1–T1 cycle a clock pulse is ANDed with the SYNC signal and enables the CPU Status Latches 104 to accept the status byte from the System Data Bus 132. Although the CPU Status Latches 104 are enabled at the same time that Tri-State Drivers 146 are disabled, propagation time along the System Data Bus is sufficient to allow the status word to be entered into the CPU Status Latches.

From Table I, it is seen that the INTERRUPT ACKNOWLEDGE status word contains bits which generate the signals INTA and M1. In FIG. 2, INTA is passed through the Inverter 217 to block AND 218. This is turn blocks Quad Latches 216 and prevents any change in the value set into the latches even though a higher priority interrupt may occur at the input to the Priority Encoder 214. The output of inverter 217 is passed through a further inverter 234 to enable one input of a NAND 236. NAND 236 further receives the signal DBIN which is produced on output lead 238 of the Microprocessor, hence the low level output signal from NAND 236 enables Tri-State Drivers 220 as well as further Tri-State Drivers 219 and 221. The outputs from Tri-State Drivers 219–221 are connected to the CPU Data Bus 44. Tri-State Drivers 219 and 221 have their inputs connected to ground, hence these drivers produce the high level signals CPUDB 0, CPUDB 1, CPUDB 6 and CPUDB 7 anytime the drivers are enabled. One of the drivers 220 has its input connected to +V, hence it produces the high level signal CPUDB 2 anytime the drivers 220 are enabled. The level of the signals CPUDB 3-CPUDB 5 at the time the drivers 220 are enabled is determined by the binary value present at the outputs of QUAD Latch 216. Thus, assuming that an interrupt request from a Peripheral Device has been passed through Priority Encoder 200, and the signal on lead 212 is the highest priority request at Priority Encoder 214, QUAD Latches 216 are storing the value 010. In this case the Tri-State Drivers 219–221 produce on the CPU Data Bus 44 the value 1101 0111 which corresponds to D7 in hexidecimal notation. This value is defined as a restart vector and, as shown in Table I, it corresponds in value to one of the Restart Instructions which may be executed by the Micro-processor 100. Since it it placed on the CPU data bus during machine cycle M1 it is treated as an operation code and is gated into the Microprocessor Instruction Register 18 in the same manner as the Instruction Register is normally loaded with a new instruction during M1.

The output of inverter 217 is applied to the strobe input of Octal Decoder 222 so that when the signal INTA occurs the binary output of Quad Latches 216 is decoded to produce a low level output signal on any one of eight output leads. Assuming that latches 216 are storing the binary value 010, Octal Decoder 222 produces a low level output signal on a lead 242. The signal is passed through an inverter 244 and applied to one input of a NAND 246 and the reset inputs of two D-type flip-flops 248 and 250. The high level output of inverter 244 has no effect on flip-flops 248 and 250 but both flip-flops will be in the reset condition. The reset output of flip-flop 250 enables a second input of NAND 246 and the third input receives the clock signal $\phi$2B. Therefore, at $\phi$2B of M1-T2 NAND 246 produces a low level output signal that is inverted by NOR 208 to become the high level signal that clocks the output of QUAD MUX 202 into Quad Latch 206. At the end of $\phi$2B, NAND 246 is again blocked and the output of NOR 208 drops to the low level thereby enabling Octal Decoder 210 to generate the $\overline{\text{BUS GRANT}}$ signal.

The output of NAND 246 is connected to the clock inputs of flip-flops 248 and 250. The reset output of flip-flop 248 is connected back to the D input of the flip-flop while the set output of flip-flop 248 is connected to the D input of flip-flop 250. Therefore, when the output of NAND 246 rises to the high level flip-flop 248 is set thereby dropping the signal $\overline{\text{IXFR TIME}}$ to the low level. At the same time, the set output of flip-flop 248 rises to the high level and the signal on lead 252 disables Priority Encoder 200 so that it cannot accept further interrupt requests. The 2, 1 and 0 outputs of Priority Encoder 200 rise to the high level causing low level signals to be applied to all the inputs of Quad Latches 206. The GS output of Priority Encoder 200 also rises to the high level and, assuming no other interrupt requests are being applied to Priority Encoder 214, its 2, 1 and 0 outputs all rise to the high level while its EO output drops to the low level thus terminating the INTERRUPT signal to the microprocessor. Quad Latches 206 cannot accept the low level signals applied to its inputs nor can Quad Latches 216 receive the high level signals applied to its inputs at this time. Thus, Octal Decoder 210 continues to produce the signal $\overline{\text{BUS GRANT 3}}$ and Octal Decoder 222 continues to produce the low level signal on lead 242.

At $\phi$2B of M1-T3 the output of NAND 246 again drops to the low level and the high level output from NOR 208 clocks the low level signals from Quad Mux 202 into Quad Latches 206. This causes high level signals to be applied to all inputs of Octal Decoder 210. At the same time, a $\phi$2B clock pulse is applied to AND 218 but since the signal INTA is at the high level the AND is blocked thus preventing any change in the setting of Quad Latches 216. The low level output from inverter 232 enables the Octal Decoder 222 so that it may continue to produce the low level signals on lead 242.

At the end of $\phi$2B, the output of NAND 246 again rises to the high level and, since flip-flop 248 is set the output of NAND 246 sets flip-flop 250 and resets flip-flop 248. When flip-flop 248 is reset, the signal $\overline{\text{IXFR TIME}}$ again rises to the high level and the signal from the set side of the flip-flop again enables Priority Encoder 200 so that it may again accept an interrupt request. When flip-flop 250 is set its output signal blocks NAND 246 so that further $\phi$2B clock pulses cannot pass through the NAND.

Both flip-flops 248 and 250 are returned to the reset state when the signal INTA terminates to block Octal Decoder 222. This occurs early in the next machine cycle at M2-T1 when another status word is loaded into the CPU Status Latches 104.

The signal DBIN terminates at the beginning of $\phi$3A of the M1-T3 cycle thus blocking the Tri-State Drivers 219– 221.

Figure 3:
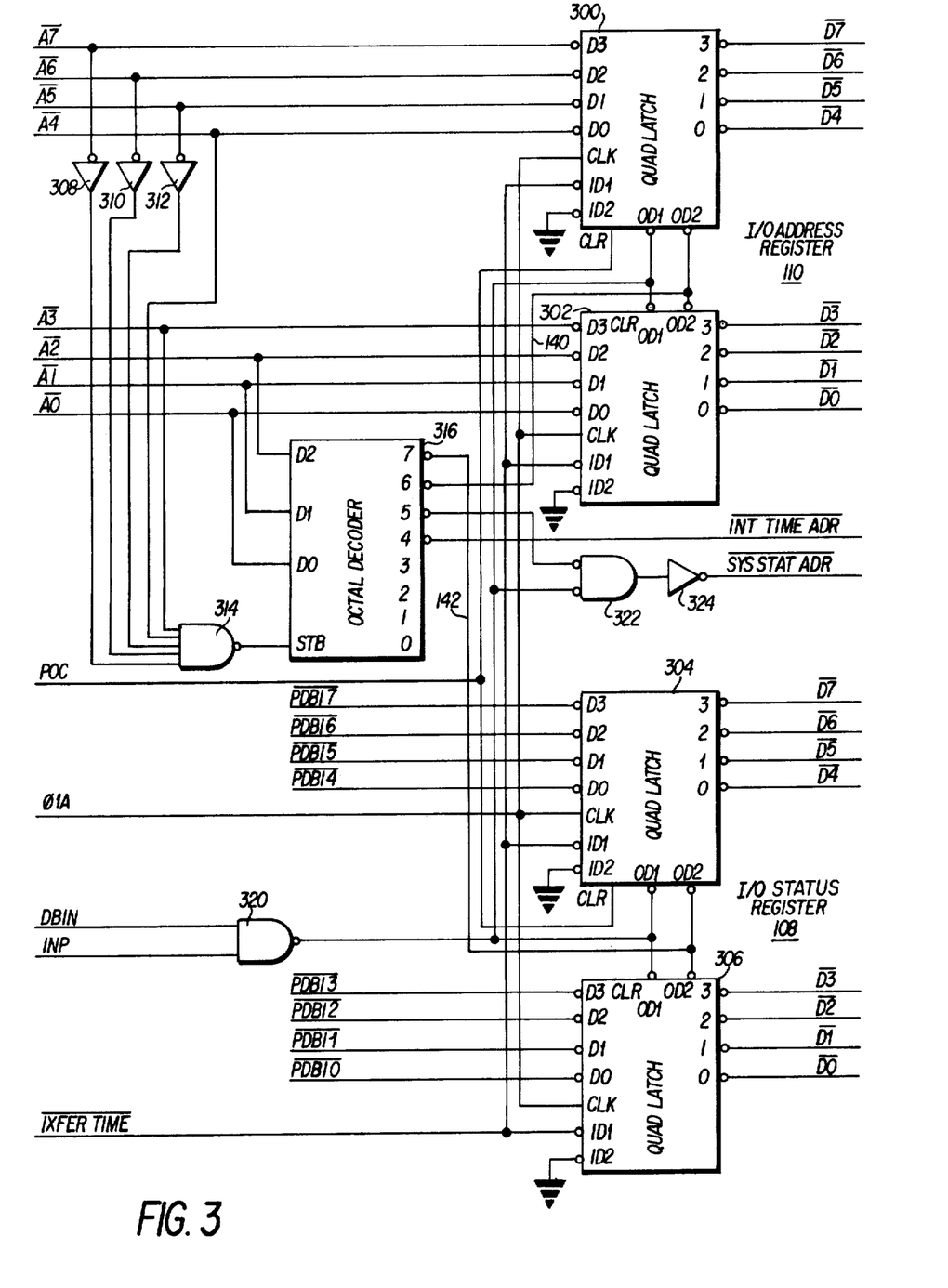
FIG. 3 is a logic diagram of the I/O Address Register, the I/O Status Register, and the addressing circuits therefor.

During the interval that the signal $\overline{\text{IXFR TIME}}$ is at the low level, it blocks Tri-State Drivers 136 to prevent Microprocessor 100 from placing an address on the System Address Bus 130. At the same time, $\overline{\text{IXFR TIME}}$ enables the data inputs of the I/O Address Register and the I/O Status Register so that the status and address of the interrupting SDC, now present on buses 130 and 132 may be stored in the registers. As illustrated in FIG. 3, the I/O Address Register comprises two Quad Latch chips 300 and 302 while the I/O Status Register comprises two Quad Latch chips 304 and 306. Each quad latch has four data inputs designated D3–D0, a clock input CLK, and two control inputs ID1 and ID2 which must both be at the low level in order to clock data into the latches. In addition, each quad latch has a clear input CLR, and two inputs OD1 and OD2 which must both be at the low level in order to gate data out of the latches. The outputs of the latches are designated 3–0. The outputs of both the I/O Address Register and the I/O Status Register are connected to the System Data Bus 132. The data inputs of the I/O Address Register are connected to the System Address Bus 130 while the data inputs of the I/O Status Register are connected to the Processor Data Input Bus 150.

As previously stated, the SDMA 120 (or whichever controller requested the interrupt) places an address on the System Address Bus 130 and an 8-bit status byte on the System Data Bus 132 throughout the interval the $\overline{\text{BUS GRANT}}$ signal is generated by Octal Decoder 210. During this interval $\overline{\text{IXFR TIME}}$ drops to the low level and at $\phi$1A the address byte and the status byte are clocked into the I/O Address Register and the I/O Status Register.

The I/O Address Register and the I/O Status Register are both addressable and are assigned the hexa-decimal addresses E1 and E0 respectively. Bits $\overline{A7}$, $\overline{A6}$, and $\overline{A5}$ on the System Address Bus 130 are passed through three inverters 308, 310 and 312 to enable three inputs of a NAND 314 if all three bits are at the low level representing bianry ones. Bits $\overline{A4}$ and $\overline{A3}$ are applied to further inputs of NAND 314, hence the NAND will be enabled only if its $\overline{A4}$ and $\overline{A3}$ are both zeros. The output of NAND 314 enables the strobe input of an Octal Decoder 316. Decoder 316 has three data inputs which receive the signals $\overline{A2}$, $\overline{A1}$, and $\overline{A0}$ from the System Address Bus 130. The decoder has eight outputs, only three of which are utilized. If the address E0 is on the System Address Bus then all of the inputs of decoder 416 receive high level signals and it produces a low level signal on lead 142. This lead is connected to latches 304 and 306 to enable read out from the I/O Status Register. If address E1 appears on the system address bus then the D2 and D1 inputs of decoder 316 will be at the high level while input D0 is at the low level. In this case the decoder produces a low level signal on lead 140 to enable read out from the I/O Address Register.

The time at which the address and status of the interrupting device are read out of the I/O Address Register and the I/O Status Register is determined by the programmer. Once the restart vector has been generated and transferred to the Instruction Register 18 in the Microprocessor 100 it causes two consecutive stack write operations to be performed during machine cycles M2 and M3. During these cycles the contents of the upper and lower halves of the Program Counter 36 are loaded into the stack in Memory 106 at the address specified by the Stack Pointer Counter 34. The restart vector is also loaded into Temporary Register 16 at the same time it is loaded into Instruction Register 18. At the end of the instruction cycle the W and Z registers are reset, the restart vector is loaded into the Z Register, and the contents of the W and Z Registers are transferred to Address Latch 38 so as to address Memory 106 over Address Bus 40. However, during the transfer of the restart vector the two high order bits and three low order bits are blocked out so that the Address Latch 38 receives the value 00XXX000 where the X's correspond to bits 3, 4 and 5 of the restart vector. Since the restart vector generated by an interrupt request from an external device has the hexadecimal value D7, this results in the hexadecimal value 10 being entered into the Program Counter. Therefore, on the next instruction cycle following the one which processes the interrupt request, and at $\phi$ 4 of cycle M1-T1, the instruction stored at memory location 10 is read out of the Memory 106 and through Latch Receiver 148 and Tri-State Drivers 152, from whence it is entered into Instruction Register 18 for execution. This is the first instruction of a sequence of up to eight bytes stored in consecutive memory locations and provided for analyzing which device caused the interrupt, the status of the interrupting device, and what should be done in response to the interrupt.

Once the restart vector in the Address Latch 38 has been used to address memory location 10, it is incremented in the Incrementer/Decrementer and entered into Program Counter 36.

Execution of the instruction at location 10 is the earliest time at which the I/O Address Register 110 or the I/O Status Register 108 may be read out. However, read out may come later in the interrupt analysis sequence as determined by the programmer. Assume for purposes of illustration that the instruction at memory location 10 is an INPUT instruction calling for the transfer of the I/O Address Register to the Accumulator. When the instruction is read out of Memory 106 it passes through Latch Receiver 148 and Tri-State Drivers 152 to the Microprocessor 100. The Microprocessor decodes the instruction and places the address on the address bus 40. The address of the I/O Address Register is passed through Tri-State Drivers 136 and over the System Address Bus 130 to the Register Select circuits 138. In FIG. 3, the address (E1) is decoded by Octal Decoder 316 to produce a low level output signal on lead 140 to enable latches 300 and 302. The instruction causes an INPUT READ status word to be loaded into the CPU status latches 104. As shown in Table II, the INPUT READ status word causes generation of the signal INP.

The signal INP is applied to one input of a NAND 320 and upon occurrence of the signal DBIN the NAND produces a low level output signal that is applied to the OD1 control inputs of the I/O Address Register. When this signal occurs it gates the contents of the I/O Address Register onto the System Data Bus for entry into the Accumulator 10. The value from the I/O Address Register passes through the Latch Receiver 148 and Tri-State Drivers 152 into the Accumulator within the Microprocessor.

The contents of the I/O Status Register may likewise be gated into the Accumulator 10 by execution of an INPUT instruction with an address E0. In this case the address causes Octal Decoder 316 to produce a low level signal on lead 142 to condition the OD2 inputs of the Status Register so that upon occurrence of INP and DBIN the output of NAND 320 gates the contents of the Status Register onto the System Data Bus from whence it passes through Latch Receivers 148 and Tri-State Drivers 152 and over the CPU Data Bus 44 to the Accumulator 10.

From the foregoing description, it is believed obvious that any Peripheral Device generating an Interrupt Request signal that is applied to Priority Encoder 200 causes the same value (D7) to be generated as the restart vector. While the invention has been explained in terms of interrupt requests from peripheral devices, it has broader applications as previously indicated. For example, circuits may be provided to generate a $\overline{\text{RESET INT REQ}}$ signal when the operator depresses a reset key on a control panel. The signal $\overline{\text{RESET INT REQ}}$ acts through Priority Encoder 214 and Quad Latch 216 to generate the restart vector C7. In addition Octal Decoder 222 generates the signal $\overline{\text{RESET INT ACK}}$ which may be transmitted back to the circuits which made the request.

The System Status Register 112 is provided for storing the status resulting from certain error conditions. For example, if an error occurs in addressing Memory 106, or if there is a parity error in the word read from the Memory, a signal is applied to Error Logic 116 to store in System Status Register 112 an indication of the error. Next, the Error Logic 116 generates the signal $\overline{\text{SYSTEM CHECK INT}}$ which is applied to Priority Encoder 214. This causes the restart vector CF to be generated while decoder 222 produces the signal $\overline{\text{SYS CHECK INT ACK}}$. This latter signal is returned to Error Logic 116 to acknowledge that the requested interrupt has been granted. The restart vector CF causes the Microprocessor 100 to store the contents of the Program Counter 36 and vector or jump to address 08 (Table I) which will contain the first instruction of the subroutine for analyzing the cause of the interrupt.

The System Status Register 112 is addressable in the same manner as the I/O Address Register and the I/O Status Register. In FIG. 3, the address E2 conditions Octal Decoder 316 to produce a signal at terminal 5. This signal is applied to NAND 322 which is further enabled by the output of NAND 320 during DBIN when the CPU Status Latches 104 contain an INPUT READ status word. The output of NAND 322 is inverted at 324 to generate the signal $\overline{\text{SYS STAT ADR}}$. In FIG. 1, this signal is applied to the System Status Register 112 to read out the contents of the register to the Accumulator 10 in the Microprocessor. The system status byte passes over bus 132, through Latch Receivers 148 and Tri-State Drivers 152 and into the Microprocessor over Data Bus 44.

While a preferred embodiment of the invention has been described in specific detail, it will be understood that various modifications and substitutions may be made therein without departing from the spirit and scope of the invention as defined in the appended claims.

We claim:
1. A data processor system comprising:
 a central processor including means for executing a sequence of instructions;
 memory means for storing instructions and data;
 a peripheral device including means for generating a peripheral device interrupt signal when communication between said central processor and said peripheral device is desired;
 a common system bus connected to said central processor and said memory means;
 control means connected to said common system bus for controlling said peripheral device;
 said control means including means responsive to a peripheral device interrupt signal for placing an interrupt request signal on said common system bus, and means responsive to a bus grant signal on said common system bus for simultaneously placing the status and address of the peripheral device requesting an interrupt on said common system bus;
 first means connected to said common system bus for generating a bus grant signal on said common system bus in response to an interrupt request signal thereon;
 second means responsive to an interrupt request signal on said common system bus for generating a central processor interrupt signal;
 an address register and a status register connected to said common system bus; and,
 means responsive to said central processor interrupt signal for enabling said address and status registers to thereby load said address and status registers with the address and status of the peripheral device requesting the interrupt.

2. A data processor system as claimed in claim 1 wherein said central processor is a microprocessor and said address and status registers are external of said microprocessor.

3. A data processor system as claimed in claim 1 and further comprising:
 third means responsive to an interrupt request signal on said common system bus for applying a restart vector to said central processor; and,
 means in said central processor for addressing said memory with said restart vector to obtain the next instruction to be executed.

4. A data processor system as claimed in claim 1 and having a plurality of peripheral devices each including means for generating a peripheral device interrupt signal, said peripheral devices being connected to said control means for control thereby.

5. A data processor system as claimed in claim 1 wherein said means for enabling said address and status registers includes means responsive to said central processor interrupt signal for generating an interrupt acknowledge signal, and means responsive to said interrupt acknowledge signal for loading said address and status registers during the same instruction cycle that said interrupt acknowledge signal is generated.

6. In a data processing system of the type having a central processor means connected by a common bus means to a plurality of access means, said access means selectively controlling access of a plurality of peripheral devices to said common bus means for the transfer of data between said peripheral devices and said common bus means, each said access means further including means responsive to a peripheral interrupt request for generating an interrupt request signal and means responsive to a bus grant signal for placing the address and status of the peripheral device making an interrupt request on said common bus means, the improvement comprising:
 priority encoder means responsive to interrupt request signals from said access means for applying a bus grant signal to the access means granted priority;
 means connected to said priority encoder means for generating a processor interrupt request signal in response to said interrupt request signals;
 means in said central processor responsive to said processor interrupt request signal for producing an interrupt acknowledge signal;
 restart vector generating means connected to said priority encoder means and responsive to said interrupt acknowledge signal for generating and applying a restart vector to said common bus means;
 first and second addressable registers connected to said common bus means for receiving and storing the status and address placed on the common bus means by the access means granted priority; and,
 means responsive to said interrupt acknowledge signal for gating the status and address from the common bus means into said first and second addressable registers.

7. The improvement as claimed in claim 6 wherein said central processor means includes means connected to said common bus means for utilizing said restart vector as the address of the next instruction to be executed following said interrupt.

8. The improvement as claimed in claim 6 and further comprising:
 means responsive to said interrupt acknowledge signal for controlling said priority encoder means so that the bus grant signal is applied to the access means granted priority during the interval said restart vector is applied to said common bus means, and, gating means in said common bus means and responsive to said interrupt acknowledge signal for preventing the mixing of the address and status from said access means with said restart vector.

9. The improvement as claimed in claim 6 wherein said restart vector generating means comprises:
 a further priority encoder means;
 means for applying interrupt signals indicative of various system conditions to said further priority encoder means, one of said signals being from said priority encoder means,
 said further priority encoder means determining the highest priority system condition requesting an interrupt and generating a multibit value representing the highest priority system condition;
 first means responsive to said multibit value for generating said restart vector;
 second means responsive to said multibit value for generating an interrupt acknowledge signal for the system condition granted priority, said second means disabling the generation of said bus grant signal if the system condition granted priority is not an interrupt request signal from said access means.

10. The improvement as claimed in claim 9 and further comprising a memory connected to said common bus means, and wherein said access means comprises a plurality of direct memory access controllers for controlling the transfer of data between said memory and said peripheral devices.

11. The improvement as claimed in claim 6 wherein said common system bus means includes a system address bus and a system data bus, said first addressable register having inputs connected to said system address bus for receiving an address from said access means and outputs connected to said system data bus, said second addressable register having inputs responsive to said system data bus for receiving status from said access means and outputs also connected to said system data bus.

* * * * *